April 29, 1952     A. M. PERSONS     2,594,491
FENDER GUARD
Filed June 13, 1949

*INVENTOR.*
ALEXANDER M. PERSONS
BY
*Charles R. Fay, atty.*

Patented Apr. 29, 1952

2,594,491

UNITED STATES PATENT OFFICE 2,594,491

FENDER GUARD

Alexander M. Persons, Worcester, Mass., assignor to Persons-Majestic Mfg. Co., Worcester, Mass., a corporation of Massachusetts Application June 13, 1949, Serial No. 98,826

2 Claims. (Cl. 280—152)

This invention relates to new and improved fender guards which serve to protect fenders and mud guards of any type of vehicle, but particularly of motor vehicles, and the fender guards of this invention comprise in general arched, elongated elements having fastening means at the ends thereof for attachment to vehicle fenders so that the arched members extend outwardly therefrom in a guarding or fending position whereby the vehicle fenders will be preserved against dents and scratches; this result being accomplished by reason of the fact that the vehicle fender will not contact or impinge upon obstacles such as garage doors, corner posts, gate posts and other vehicles, particularly in parking lots, the novel fender guards contacting these obstacles and preserving the vehicle fenders against injury.

Another object of the invention includes the provision of an ornamental bowed or arched elongated fender guard as above described having at each end thereof a U-shaped clip pivoted thereto by one leg, the other leg of the clip mounting a fastener adapted to secure the clip to a vehicle fender or mud guard at the edge thereof, the pivoted clip accommodating any fender regardless of the edge curvature thereof by reason of the fact that the clips may be pivoted around to whatever position is best or most convenient for securing the same thereto.

Other objects and advantages of the invention will appear hereinafter.

Reference is to be had to the accompanying drawing in which.

As is well known, fenders of modern vehicles extend increasingly outwardly beyond the wheels and body of the vehicles and, therefore, tend to be increasingly frequently damaged by contact with narrow garage doors, gate posts, and in fact, with other vehicles, particularly while parking in parking lots.

The present invention provides a device for avoiding such damage, particularly small dents and scratches, by reason of itself bearing upon the objects which commonly are engaged by the fenders and which damage the same. The present device is simple in nature, extremely easy to apply to the fender, and relatively inexpensive to manufacture, for the convenience and benefit of the motoring public.

Figure 1:
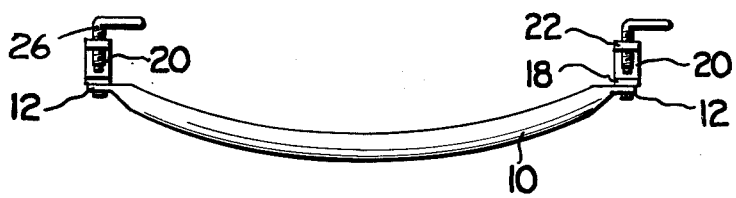
Fig. 1 is a top plan view of a fender guard according to the present invention.
Figure 2:
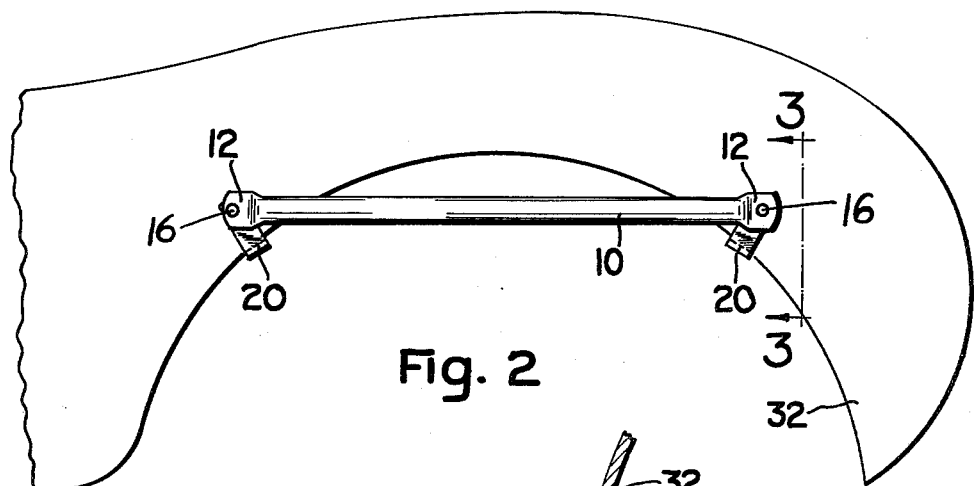
Fig. 2 is a view in elevation thereof showing the same applied to a vehicle fender.

The invention comprises an elongated rod or preferably a tube which is generally indicated at 10 and is bowed as plainly shown in Fig. 1, the ends being flattened in general parallelism as indicated at 12. The flattened ends are apertured for the reception of headed rivets 16 forming pivots for legs 18 of U-shaped clips or brackets 20, the latter having free legs 22.

The legs 22 are apertured adjacent their ends 24 for the reception of a screw threaded fastening 26 or other fastener which may have a handle 24 for actuation thereof. The axis of the screw 26 is substantially aligned with the axis of the pivots 16 so that no matter to what degree the U-shaped brackets 20 are turned, the screw threaded elements can be turned up in substantially the same relation with reference to the brackets and the fender guard itself. The reaction point for the screw threaded element will be the rivet head at 30 under all circumstances and regardless of the relative pivoted position of the bracket.

Figure 3:
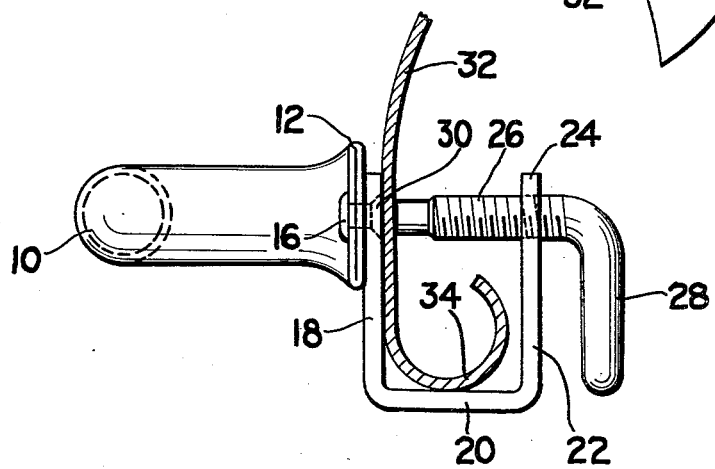
Fig. 3 is an enlarged section on line 3—3 of Fig. 2.

As shown in Fig. 3, the fender of the usual vehicle as at 32 is provided with a rounded over edge or bead 34 and this is accommodated between the arms 18 and 22 of the U-shaped bracket 20. From this, it will be obvious that the finger guard may be rigidly supported in position, and even if it becomes loosened, it will not fall off because the bead 34 will prevent loss thereof.

It will be seen that this invention provides a relatively simple fender guard for preserving costly modern fenders from scratches and dents; the fender guard may be attached or demounted for transfer to a new vehicle; it accommodates any fender regardless of the curvature thereof due to the pivoting of the U-shaped brackets and it is inexpensive to manufacture and extremely easy to apply.

Having thus described my invention and the advantages thereof, I do not wish to be limited to the details herein disclosed, otherwise than as set forth in the claims, but what I claim is:

1. A fender guard comprising an elongated longitudinally bowed element flattened at its ends in general parallelism, a pivot pin at each flat, U-shaped clip pivoted on each pin by one leg of the U, a fastener on the other leg of the U to grip a vehicle fender at the edge thereof, the latter being in the U.

2. A fender guard comprising an elongated longitudinally bowed element flattened at its ends in general parallelism, a pivot pin at each flat, U-shaped clip pivoted on each pin by one leg of the U, a fastener on the other leg of the U to grip a vehicle fender at the edge thereof, the latter being in the U, and the convex aspect of the bowed element extending away from the clips, the latter being located at the concave aspect of the element.

ALEXANDER M. PERSONS.

REFERENCES CITED

The following references are of record in the file of this patent:

UNITED STATES PATENTS

| Number | Name | Date |
|---|---|---|
| 1,162,608 | Hohl et al. | Nov. 30, 1915 |
| 1,998,134 | Gorman et al. | Apr. 16, 1935 |
| 2,143,939 | Gross | Jan. 17, 1939 |
| 2,157,020 | Sanford | May 2, 1939 |
| 2,177,112 | Johnstone | Oct. 24, 1939 |
| 2,187,952 | Rusche | Jan. 23, 1940 |